Sept. 14, 1965 J. P. KOSTICH 3,206,714
INDEXING FASTENER
Filed May 14, 1962 2 Sheets-Sheet 2
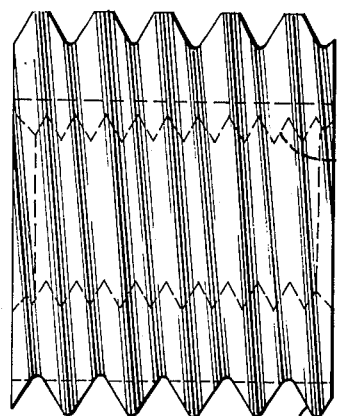
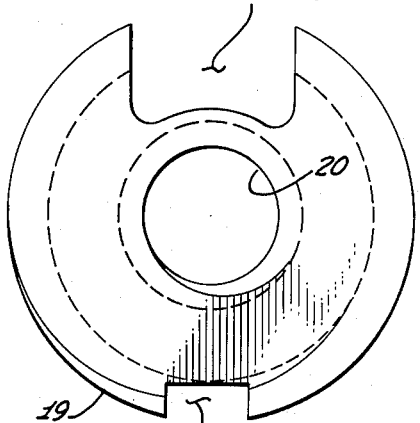
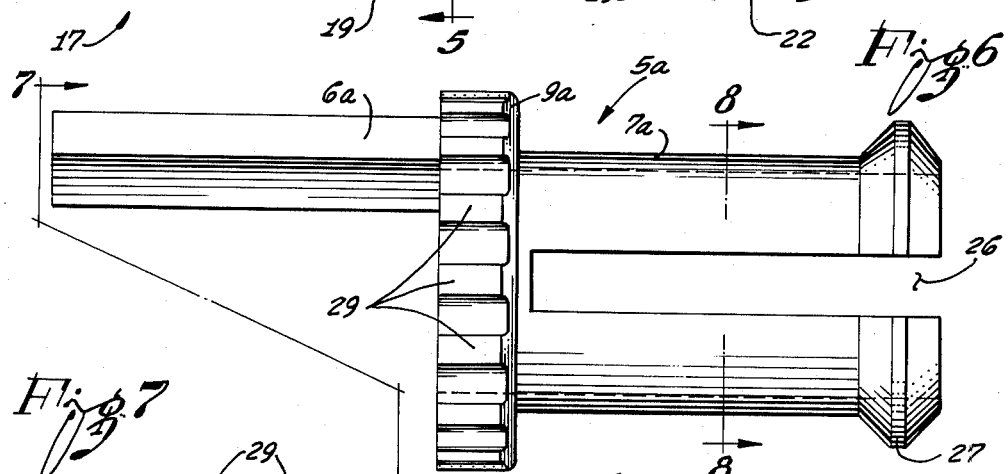
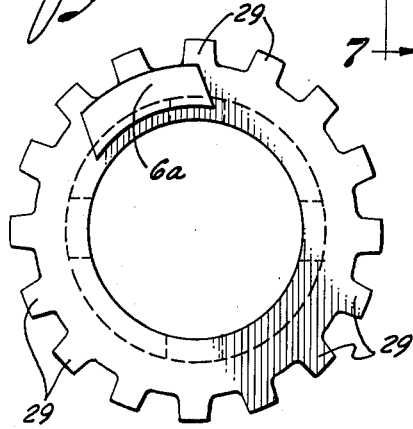
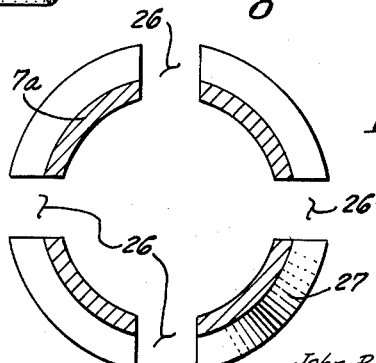
INVENTOR:
John P. Kostich, deceased
by Helen S. Kostich, Administratrix
By William M. Graham
Agent

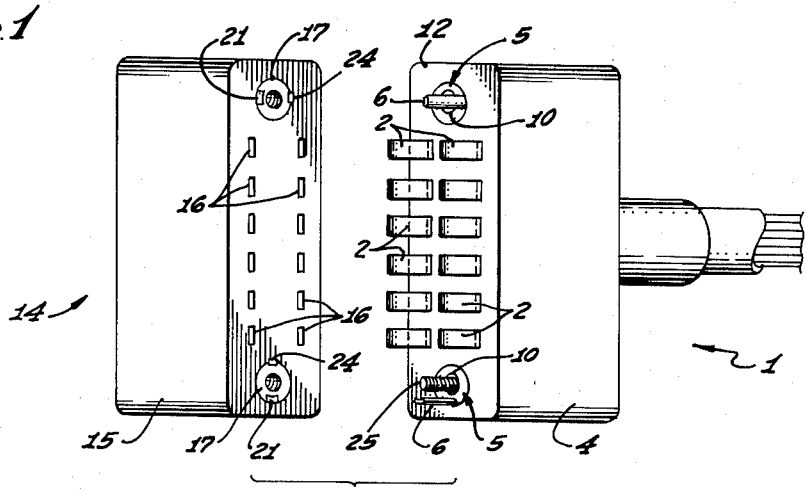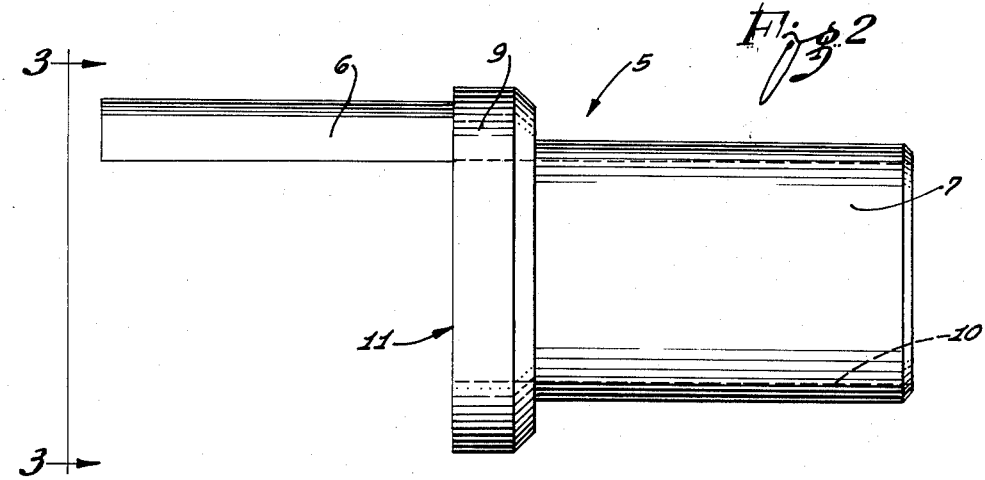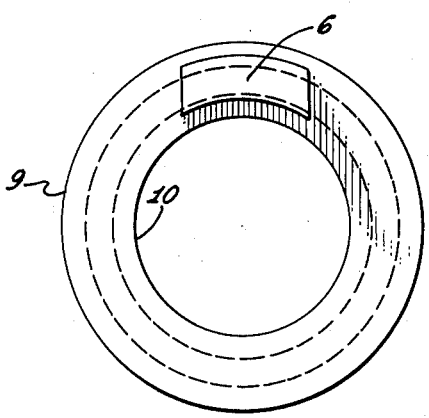

United States Patent Office 3,206,714
Patented Sept. 14, 1965

3,206,714
INDEXING FASTENER
John P. Kostich, deceased, late of Ontario, Calif., by Helen S. Kostich, administratrix, Ontario, Calif., assignor to Northrop Corporation, Beverly Hills, Calif., a corporation of California
Filed May 14, 1962, Ser. No. 194,735
2 Claims. (Cl. 339—186)

The present invention relates to indexing devices, and more particularly, to indexing or polarized fasteners for use in securing corresponding connectors together so that only the proper components are connectable.

Particularly in the electrical and electronic field, complex equipment utilizes a great number of plug and socket connectors to interconnect various modules, chassis, racks, and other portions of the system. The connectors often comprise a large number of wires or pins, arranged in identical standard fashion. When servicing this equipment in the field, for example, it might be possible to connect a cable connector into the wrong socket or receptacle.

Various previous methods designed to eliminate this problem have utilized different sizes of prongs or asymmetrical patterns of prongs so that a corresponding pair of connectors will assemble together in only one way, but this does not prevent a connector from being inserted into a different, incorrect, receptacle.

It is an object of this invention to provide indexing means usable with each connector, the indexing means having various possible positions of installation, and a mating component of its own which will fit only the correct corresponding connector to which it is desired to be secured.

A further object of the present invention is to provide indexing means having fastener provisions also, for the purpose of fastening the two connectors together after engagement.

Briefly, the invention comprises a key member in one connector and a receiver member in the corresponding mating connector, the key member having a projection positionable at any of various points around its periphery, and the receiver member having a slot or groove positionable at any of various points about its periphery, and the two members fitting together only if the projection and the slot are in the same relative position. Suitable locking means are provided to retain the members in their associated connectors, and the members are provided with axially aligned bores into which a threaded bolt or other fastener is passed for positively securing the connectors in engaged position.

In the accompanying drawings,

FIGURE 1 is a composite perspective view of a plug connector and a female receptacle equipped with one type of polarized fastening means according to the present invention.

FIGURE 2 is an elevation view of the key member shown in the assembly of FIGURE 1.

FIGURE 3 is an end view of the key member.

FIGURE 4 is an elevation view of the receiver member shown in the assembly of FIGURE 1.

FIGURE 5 is an end view of the receiver member.

FIGURE 6 is an elevation view of an alternate form of key member.

FIGURE 7 is an end view of the alternate key member of FIGURE 6.

FIGURE 8 is a cross section of the alternate key member, taken on the line 8—8 in FIGURE 6.

Referring first to FIGURE 1 for a detailed description of specific apparatus embodying the present invention, a plug connector 1 comprises a plurality of contact pins 2, a body 4, and a pair of indexing fastener key members 5 at opposite ends of the body. Each key member 5 has a finger 6 pointing in the same direction as the pins 2, but it will be noted that the fingers 6 of the two keys 5 are oriented at different respective positions in the body 4.

As shown in FIGURES 2 and 3, each key 5 comprises a cylindrical bushing 7, a shoulder 9 on one end thereof, and the aforementioned finger 6 fixed integrally to the shoulder 9. A central bore 10 is provided through the key 5, with the finger 6 positioned beyond the radial extent of the bore 10.

The keys 5 are a press fit in a corresponding aperture in the connector body 4, and preferably are placed so that the outer side 11 of the shoulder 9 is flush with an end surface 12 of the body 4. The key 5 may be installed with the finger 6 at any predetermined position around the bore 10. The key 5 may be further held against rotation by cementing it in place, staking the shoulder 9 at its intersection with the body, or any other desired manner.

The other component in FIGURE 1 is a socket connector 14 comprising a housing 15, a plurality of contact recesses 16, and a pair of indexing fastener receiver members 17 positioned to mate with the keys 5 of the plug 1. In the embodiment shown in FIGURES 4 and 5, each receiver member 17 is generally cylindrical in shape, and has an outer threaded surface 19 and an inner threaded bore 20. A relatively deep longitudinal indexing groove 21 in the outer surface 19 extends preferably the entire length of the receiver 17 and is shaped to mate with the finger 6 of the key member 5. Groove 21 may or may not intersect the inner bore 20, but it preferably does not. A relatively smaller locking slot 22 may also be provided in the outer surface 19. This receiver 17 is threaded into a corresponding threaded hole in the housing 15, and is locked in the desired position, such as by a locking key 24 (FIGURE 1) which is driven into the slot 22 and cuts into the wall of the housing 15, or by any suitable conventional means. Also, various modifications of the indexing groove 21 may be made.

The inner threaded bore 20 is for the purpose of receiving a threaded bolt 25 (FIGURE 1) for example, and it will be seen that such a bolt passing through the key member 5 and into the receiver member 17 will secure the two connectors 1 and 14 together.

FIGURES 6, 7, and 8 show an alternate form of key member 5a which may be employed, and which has positive locking against rotation in the plug connector 1. This key 5a comprises a bushing 7a having a plurality of clearance slots 26 intersecting the back or inner end thereof, at which end is formed an increased diameter V-shaped retaining flange 27. The shoulder 9a has a plurality of splines 29 regularly spaced therearound, and the finger 6a is substantially the same as in the first embodiment.

Of course when this alternate key member 5a is used, the plug body 4 will have a correspondingly shaped aperture therein for accommodating the flange 27 and for interlocking with the splines 29. In this instance, the key 5a is made of a resilient steel, for instance, and it is merely compressed at its inner end and snapped into the body 4 with the flange 27 springing out into a corresponding recess or countersunk portion and with the proper splines 29 engaged to place the finger 6a at its predetermined location. Of course, other materials can be used instead. This key 5a is easily removed and re-inserted in a different position.

Sixteen splines 29 are provided in the present embodiment, illustrating that it is easy to provide at least 16 different indexing positions for each indexing device assembly. With one assembly at each side of a single connector, this obviously provides for $16^2$ or 256 different possible combinations of plug and socket connections. In actual practice the use of only eight different indexing positions for each key and receiver member will usually be adequate.

In all embodiments of this invention, the angular width of the indexing finger 6 and groove 21 makes relatively little difference. This dimension should not be so large that the receiver member 17 is weakened or so small that the finger 6 is apt to be bent. A width of substantially 45 degrees is illustrated herein.

It is obvious that various modificatons of the present fasteners can be made. For instance, the splines of FIGURES 6 may be incorporated on the key 5 of FIGURE 2, or be moved to the opposite end of the key in modified designs. The screw threads may be incorporated in the key member instead of in the receiver member. In one preferred embodiment used extensively, the overall length of the key member is about 0.7 inch, and the outer diameter of its bushing portion is 0.2 inch.

While in order to comply with the statute, the invention has been described in lauguage more or less specific as to structural features, it is to be understood that the invention is not limited to the specific features shown, but that the method and means herein disclosed comprise several forms of putting the invention into effect, and the invention is therefore claimed in any of its forms or modifications within the legitimate and valid scope of the appended claims.

What is claimed is:

1. Indexing fastener means for mating components, comprising: a single-piece cylindrical receiver member having an external threaded surface and an internally threaded longitudinal bore, means defining a longitudinal indexing slot in said external surface, separate means in said external surface for locking said receiver member in any of a plurality of rotated positions in one of the mating components; a single-piece key member having a generally cylindrical body with a longitudinal bore therein, an off-axis finger extending from said body parallel to said bore; said key member being mountable in any one of a plurality of rotated positions in the other mating component; said bores of said members being coaxially aligned, with said finger fitting into said slot inside the inner diameter of the external thread on said receiver member surface.

2. Apparatus in accordance with claim 1 including a bolt sized to pass through said key member bore and thread into said receiver member bore, whereby said receiver and key members are fastenable together.

References Cited by the Examiner

UNITED STATES PATENTS

| | | | |
|---|---|---|---|
| 858,549 | 7/07 | West et al. | 151—8 |
| 2,400,348 | 5/46 | Greene | 151—57 |
| 2,890,445 | 6/59 | Korry | 339—186 X |
| 2,902,665 | 9/59 | D'Amico | 339—92 X |
| 2,979,689 | 4/61 | Jackson et al. | 339—217 |
| 3,023,394 | 2/62 | Hubbell | 339—186 |
| 3,075,169 | 1/63 | D'Amico | 339—217 |
| 3,085,221 | 4/63 | Kelly et al. | 339—186 |
| 3,120,985 | 2/64 | Hubbell | 339—186 X |

FOREIGN PATENTS

| | | |
|---|---|---|
| 653,734 | 12/62 | Canada. |
| 767,844 | 2/57 | Great Britain. |

JOSEPH D. SEERS, *Primary Examiner.*